United States Patent [19]

Beckman

[11] Patent Number: 4,518,997
[45] Date of Patent: May 21, 1985

[54] DEMODULATOR HAVING TWO PHASE SHIFT NETWORKS FOR WIDE BAND TELEVISION AUDIO

[75] Inventor: Orval E. Beckman, Wheaton, Ill.

[73] Assignee: Zenith Radio Corporation, Glenview, Ill.

[21] Appl. No.: 457,604

[22] Filed: Jan. 13, 1983

[51] Int. Cl.³ ............................ H04N 5/60; H04N 7/04
[52] U.S. Cl. ........................................ 358/198; 358/144; 329/137
[58] Field of Search ................. 358/144, 197, 198; 329/103, 137, 138, 141, 142; 455/214, 337; 375/78, 83, 84, 85, 86; 381/3, 7, 15

[56] References Cited

U.S. PATENT DOCUMENTS 3,519,944  7/1970  Avins ................................ 329/137
4,359,694  11/1982  Suenaga ........................... 329/103

OTHER PUBLICATIONS

*Television For Radiomen,* by Edward M. Noll, The McMillan Company, (1955), pp. 319–324, TK 6630 N6.

Primary Examiner—John C. Martin
Assistant Examiner—Michael D. Parker

[57] ABSTRACT

A television receiver includes an integrated circuit audio system suitable for stereo sound, and a source of angle-modulation audio waves supplied from a limiter/integrator to a differential amplifier detector. A series parallel arrangement of elements in a first phase shift network has the parallel connected elements coupled across the inputs of the differential amplifier detector. A second phase shift network, coupled directly across the limiter/integrator output, loads the first phase shift network and linearizes the audio system output over a large signal deviation. The output of the differential amplifier detector supplies the detected audio output.

10 Claims, 4 Drawing Figures

FIGURE 2

DEMODULATOR HAVING TWO PHASE SHIFT NETWORKS FOR WIDE BAND TELEVISION AUDIO

BACKGROUND OF THE INVENTION AND PRIOR ART

This invention relates to integrated circuit audio systems and particularly to integrated circuit audio systems useful in television receivers.

Conventional television audio signals comprise angle-modulated carrier waves, characterized in that information is carried by changes in the frequency or phase of the carrier wave, as distinct from changes in carrier wave amplitude. The advantages of frequency/phase modulation over amplitude modulation are well known and the circuitry for detection of such waves in television receivers is not only well known, but has been extensively used in integrated circuit form.

With the growing emphasis on use of integrated circuitry in electronic apparatus and especially in mass produced television receivers, circuit designs that minimize usage of components and circuitry that cannot conveniently be incorporated into an integrated circuit format are in great demand.

U.S. Pat. No. 3,519,944 issued July 7, 1970 in the name of Jack Avins discloses an integratable audio circuit that has found wide acceptance and use in the television industry. In that circuit, the intercarrier sound signal is limited to remove amplitude modulation noise and supplied to a discriminator. The discriminator, in turn, supplies a differential amplifier detector through a single, external phase shift network which is series-parallel resonant at frequencies above and below the 4.5 MHz intercarrier sound beat frequency. Since signals across the phase shift network are in antiphase, that is, they are approximately 180° out of phase with each other, they subtract in the output of the differential amplifier detector further reducing variations in carrier amplitude. The result is a fairly linear detector detection curve with signal deviation. The circuit is very highly integrated with the exception of the parallel tuned circuit elements.

Recently a number of different broadcast transmission systems have been proposed to enable television signals to include a second sound channel for stereo and to have a third channel capability for a foreign language. In all of the proposed systems, the signal handling capability will impose more stringent requirements on the linearity of the audio circuitry. The linearity of the patented system is not believed satisfactory in this respect since the present deviation of ±25 KHz will need to be increased substantially to produce sound quality compared with non-television stereo sources. Thus, present integrated circuit designs for monaural television sound must be revised to provide comparable performance with proposed television multiple sound transmissions.

While the technology is readily available to yield excellent wide-band audio response in television receivers, different circuitry is required. This poses a dilemma for manufacturers desirous of keeping costs at a minimum without sacrificing performance. It would be very advantageous to enable the continued use of presently available integrated audio circuitry even in "top-of-the-line" television receivers having the added sound service capability circuitry. Thus there is a need in the art for a simple circuit to enhance the capabilities of the above-mentioned integrated audio circuit.

OBJECTS OF THE INVENTION

Accordingly the principal object of this invention is to provide an improved audio circuit.

Another object of this invention is to provide an integrated circuit audio system having enhanced capabilities.

Another object of this invention is to provide an integrated circuit audio system capable of reproducing quality sound in television receivers.

SUMMARY OF THE INVENTION

In accordance with the invention an integrated circuit audio system includes a source of angle-modulated signals coupled to a limiter/integrator for developing an output substantially free of amplitude modulation. A first phase shift network is coupled to the limiter/integrator. A differential amplifier detector is coupled to the output of the limiter/integrator and arranged with respect to the first phase shift network such that opposite polarity voltages from the limiter/integrator are applied across the inputs of the differential amplifier detector. A second phase shift network is coupled across the limiter/integrator for linearizing the response of the audio system.

BRIEF DESCRIPTION OF THE DRAWINGS

Further objects and advantages of the invention will become apparent upon reading the following description of the preferred embodiment thereof in conjunction with the drawings in which:

FIG. 2 is a detailed schematic diagram of the integrated audio circuit of FIG. 1;

DESCRIPTION OF THE PREFERRED EMBODIMENT

Figure 1:
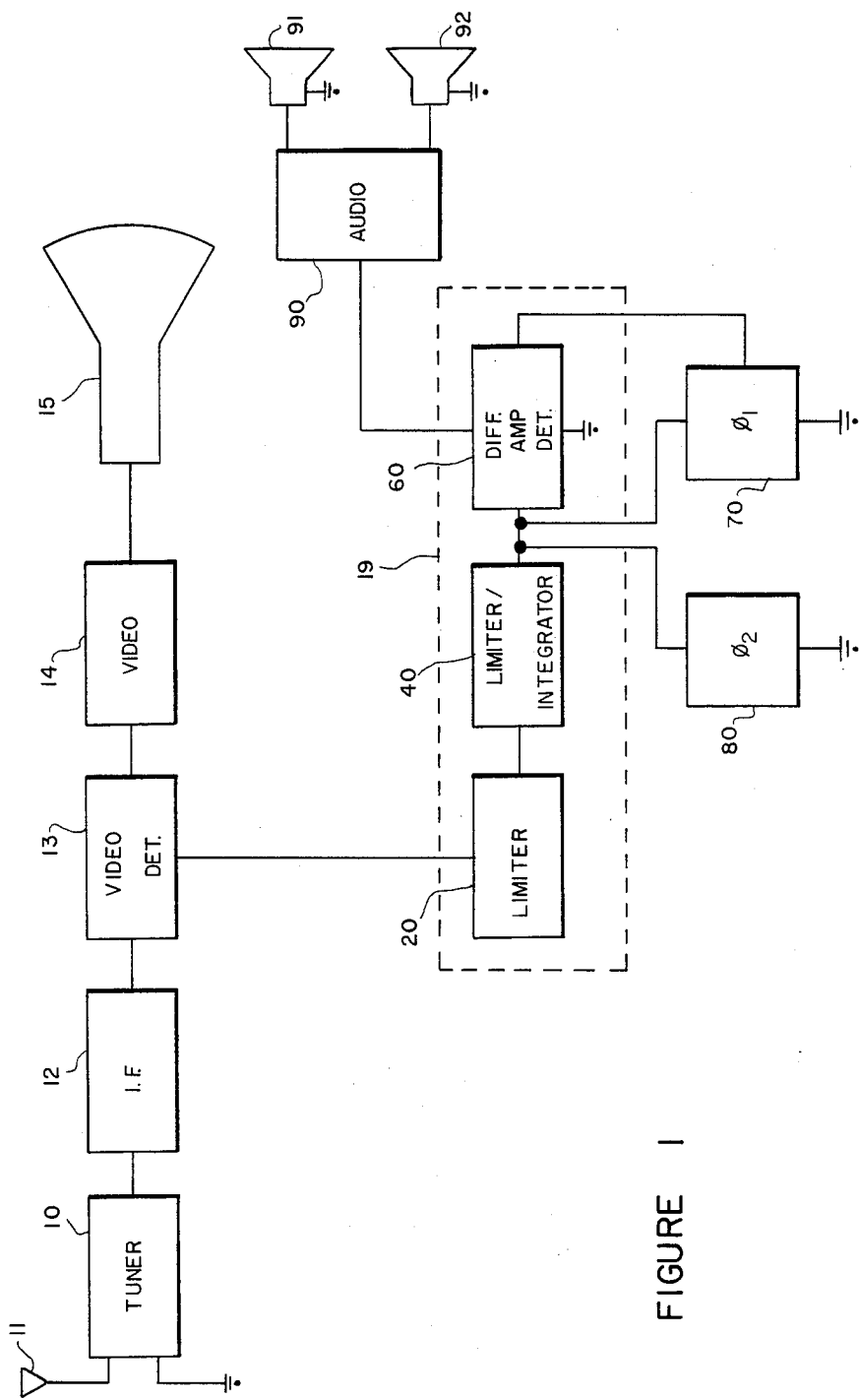
FIG. 1 is a block diagram of a television receiver which incorporates the invention.

FIG. 1 discloses a television tuner 10 coupled to an antenna 11 for processing received broadcast television signals in a conventional manner. The output of the tuner is supplied to an IF amplifier 12 where the intermediate frequency signals developed by the tuner are amplified and supplied to a video detector 13. Video detector 13 provides detected signals to a video circuit 14 which, in turn, supplies video information to the beam modulation elements (not shown) in a picture tube 15. In this simplified diagram, power supply means and the means for deflecting the electron beam in the picture tube are omitted and should be considered to be well-known and conventional.

Video detector 13 has another output connected to an audio integrated circuit 19, indicated by a dashed line block, which encompasses a limiter 20, supplying a limiter/integrator 40 that, in turn, feeds a differential amplifier detector 60. Differential amplifier detector 60 has a first phase shift network 70 coupled across its two inputs and its output signal is supplied to an audio circuit 90 that drives a pair of speakers 91 and 92. With the exception of audio circuit 90 and speakers 91 and 92, the above-described circuit is conventional with the elements indicated in integrated circuit 19 and the first phase shift network being the same as described in the patent. The difference resides in the provision of a second phase shift network 80 coupled across the output of limiter/integrator 40, which loads the first phase shift network.

It should be noted that, while the invention is directed to an integrated audio circuit for use in a television receiver equipped to receive multiple sound transmissions, the details of the multiple sound detection circuitry are unimportant. Irrespective of the multiple sound transmission system eventually adopted by the Federal Communications Commission, the maximum allowable deviation for multiple sound signals will need to be increased substantially from the present ±25 KHz and will place very heavy demands on the linearity of existing audio circuitry. In at least one proposed system the deviation will be ±40 KHz.

Figure 2:
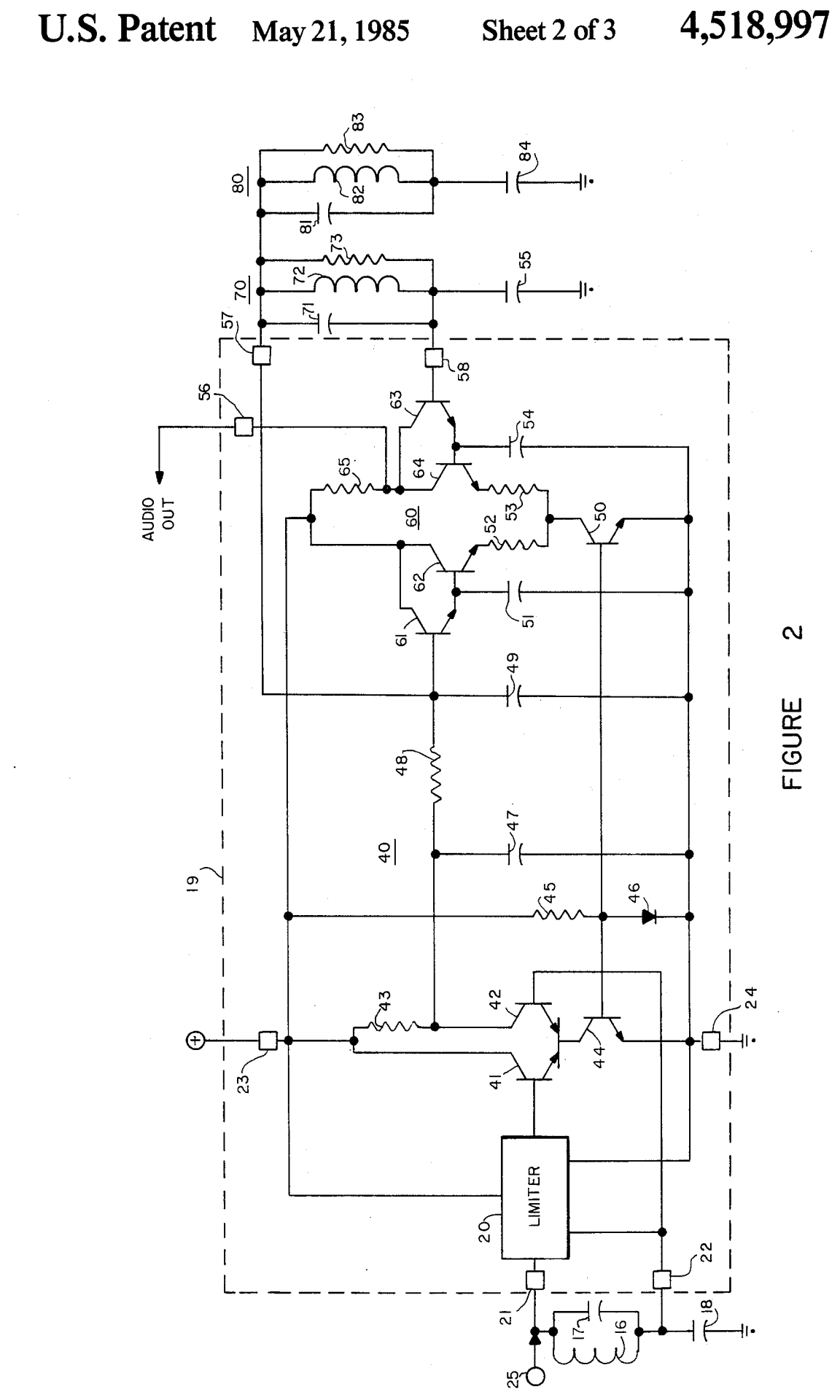

In FIG. 2 dashed line block 19 is expanded to indicate many of its circuit details. Limiter 20, which may also take the form illustrated in the above-mentioned patent, is coupled to a source of angle-modulated signals supplied to terminal pads or pins on the integrated circuit (IC) through a terminal 25. Thus, a parallel tuned circuit comprising an inductor 16 and a capacitor 17, is connected across terminal pins 21 and 22 of IC 19. A capacitor 18 is coupled from terminal pin 22 to ground potential. Limiter 20 is coupled across a source of positive direct current potential (not shown) supplied to IC 19 through a positive terminal pin 23 and a grounded terminal pin 24.

Limiter/integrator 40 includes a limiter comprising a differentially-coupled pair of transistors 41 and 42, having a load resistor 43 connected between positive terminal pin 23 and the collector of transistor 42. The collector of transistor 41 is connected directly to positive terminal pin 23. A current-source transistor 44 is coupled between the commonly connected emitters of the differential pair and grounded terminal pin 24. The output of limiter 20 is supplied to the base of transistor 41 and the base of transistor 42 is connected to terminal pin 22. A fixed bias is applied to the base of transistor 44 and to the base of another current source transistor 50 by a diode 46 which is coupled to positive terminal pin 23 through a resistor 45. The output of limiter transistor 42 is taken from load resistor 43 and supplied to the integrator comprising a capacitor 47, a resistor 48, and a capacitor 49, connected in a Pi configuration. The integrator integrates the limiter output signal, all as described in the mentioned patent.

The junction of resistor 48 and capacitor 49 is coupled to the input of a first Darlington connected pair of transistors 61 and 62 in differential amplifier detector 60. The collectors of these transistors are connected to positive pin 23. A second darlington connected pair of transistors 63 and 64 have their collectors, connected through a load resistor 65 to positive terminal pin 23. The emitters of transistors 62 and 64 are connected, through resistors 52 and 53, to the collector of current source transistor 50, mentioned previously. The base of transistor 62 is coupled to ground through a capacitor 51 and the base of transistor 64 is coupled to ground through a capacitor 54. The audio output signal is supplied from load resistor 65 to a terminal pin 56. The base of transistor 63 is connected to ground through a capacitor 55 and to a terminal pin 58.

The bases of transistors 61 and 63 comprise the inputs of the differential amplifier detector. The junction of capacitor 49 and resistor 48 carries the limiter/integrator output signal, and is connected to a terminal pin 57. Coupled across terminal pins 57 and 58 is a parallel connected capacitor 71 and inductor 72 which, with capacitor 55, form a first phase shift network 70.

Ignoring the rest of the circuit for the moment, the arrangement thus far described is substantially the same as that illustrated in the above-mentioned patent. The parallel tuned circuit in phase shift network 70 includes capacitor 71 and inductor 72, whereas the series tuned circuit in the network includes these elements and capacitor 55. Resistor 73, coupled across the parallel combination of capacitor 71 and inductor 72 is not disclosed in the patented circuit and is added to introduce loading on the high Q tuned circuit.

A second phase shift network 80, comprises a capacitor 81, connected in parallel with both an inductor 82 and a resistor 83, and a series connected capacitor 84. Network 80 is connected between terminal pin 57 of IC 19 and ground. It will be noted that, unlike phase shift network 70, phase shift network 80 is connected directly across the output of limiter/integrator 40 without being connected to transistor 63 of differential amplifier detector 60.

As mentioned, the components of phase shift network 70 and phase shift network 80 are all external to IC 19 (capacitor 55, in some designs, may be incorporated into the I.C. but in the specific I.C. implementation under consideration it is added externally). Further, as will be seen, capacitors 71 and 81 and inductors 72 and 82 are similar in value and the networks are tuned to the same frequency. Consequently, not only is a simplification in parts and circuitry achieved, but alignment is also simplified. Thus, in addition to the advantages mentioned above, second phase shift network 80 adds very little to the manufacturing and alignment costs of the audio circuit. Yet the performance improvement is striking, as will be seen by reference to FIGS. 3 and 4.

Figure 3:
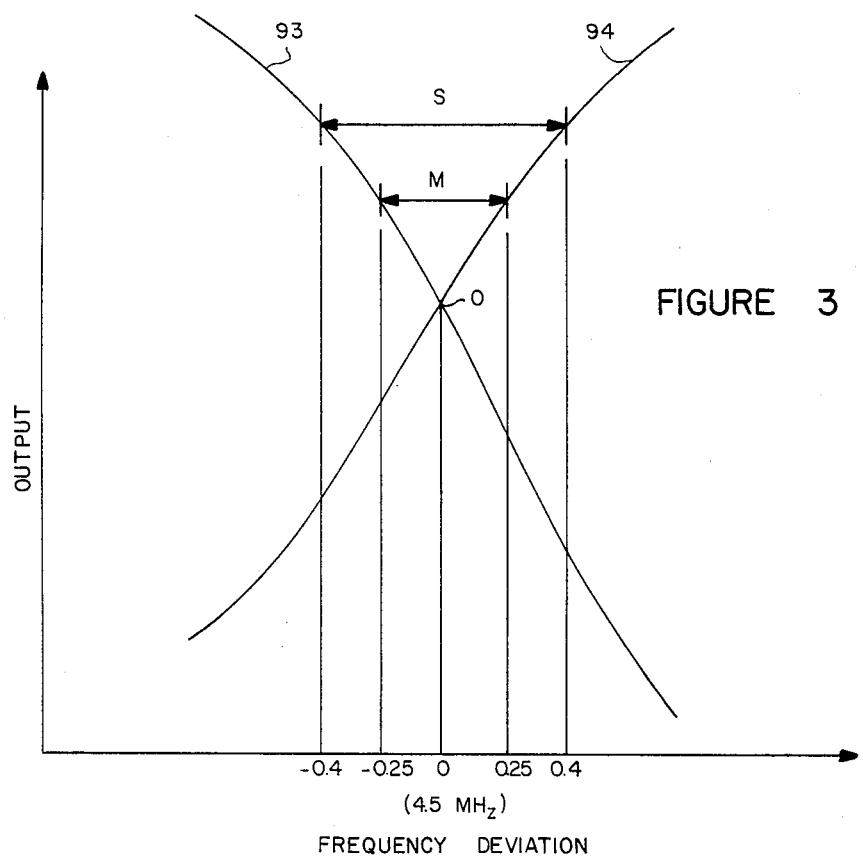
FIG. 3 is the response characteristic of a prior art integrated audio circuit showing output as a function of signal frequency deviation.

FIG. 3 is a graph of the output response of the detector for deviation in input signal about a 4.5 MHz center frequency. Curve 93 is the response waveform taken between terminal pin 58 and ground and curve 94 that taken between terminal pin 57 and ground. As taught in the patent, the response waveforms subtract in the output of the differential amplifier detector to produce a conventionally-shaped detector response characteristic. The portion delineated by a double-headed arrow "M" represents the normal deviation for monaural television audio transmission (±25 KHz). The portion indicated by the double-headed arrow "S" indicates the much wider deviation required for television multiple sound transmissions (estimated to be ±40 KHz). The curvature of the response curves between the zero point and the deviation extremeties show the degree of departure from linearity and represents distortion.

Figure 4:
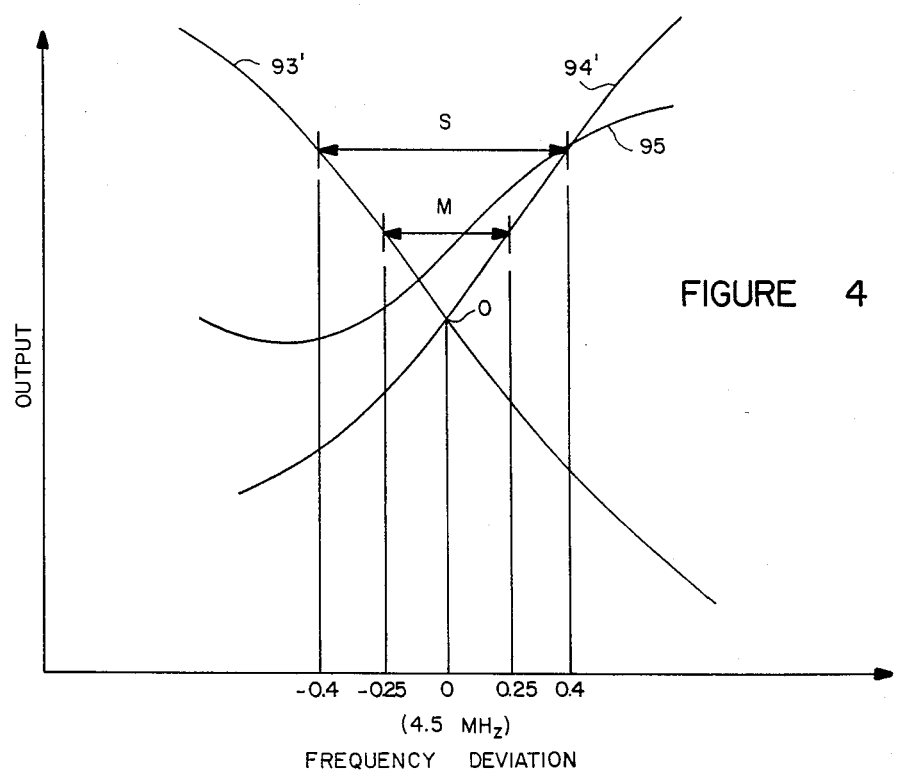
FIG. 4 is a similar response characteristic of the circuit of the invention showing the improvement in linearity.

In FIG. 4, similar response curves are shown for the circuit of the invention. Curve 95 represents the response of the second phase shift network 80 connected to terminal pin 57, with phase shift network 70 disconnected. Consequently this curve is representative of the amplitude and phase loading effect of the network 80 on the output of limiter/integrator 40. Essentially, the response of phase shift network 80 is subtracted from that which exists normally at this pin connection. The resultant is indicated by response curves 93' and 94'. Noting the deviations delineated by the double-headed arrows "M" and "S", will readily show that these portions of the curves are very nearly straight lines and show a dramatic improvement in linearity, with a consequent reduction in distortion. The following table indicates the measurements of distortion at different signal deviations for the two circuits.

| DEVIATION | DISTORTION (FIG. 3) | DISTORTION (FIG. 4) |
|---|---|---|
| 25 KHz | 1.2% | 0.15% |
| 30 KHz | 1.7% | 0.15% |
| 35 KHz | 2.2% | 0.24% |
| 40 KHz | 2.9% | 0.45% |
| 50 KHz | 4.0% | 1.0% |

Thus the distortion improvement with the circuit of the invention is readily apparent.

The integrated circuit utilized is a Zenith Radio Corporation part No. 221-178 (manufactured entirely by SGS), and the values of the components are as follows:

| | |
|---|---|
| Inductors 72 and 82 | 10.4 microhenries |
| Capacitors 71 and 81 | 120 pf. |
| Capacitor 55 | 9 pf. |
| Capacitor 84 | 5.6 pf. |
| Resistor 73 | 22 kohm |
| Resistor 83 | 33 kohm |

What has been described in a novel integrated audio circuit arrangement that enables substantially wider signal deviation with less distortion than the prior art by the addition of a second tuned circuit tuned to the same frequency as the existing tuned circuit. It will be appreciated that numerous modifications in the described embodiment of the invention will be apparent to those skilled in the art without departing from its true spirit and scope. The invention is to be limited only as defined in the claims.

What is claimed is:

1. In a television receiver of the type having an integrated circuit audio system including a limiter/integrator, a differential amplifier detector, and a single phase shift network coupled across inputs of the detector for producing a detected output from an input of angle-modulated waves, the phase shift network being effective for producing signals that are substantially 180 degrees out of phase with respect to the inputs of the detector, the improvement comprising:
   means coupled directly across the output of said limiter/integrator and ground for linearizing the response of said system.

2. A television receiver as set forth in claim 1 wherein the linearity of said system is extended to encompass a ±40 MHz deviation in input signal frequency.

3. A television receiver as set forth in claim 2 wherein said means comprises a second phase shift network coupled across the output of said limiter/integrator.

4. A television receiver as set forth in claim 3 wherein said second phase shift network is tuned to the same frequency as the first-mentioned phase shift network.

5. A television receiver as set forth in claim 4 further including first and second transistors and wherein said detector has a first and a second capacitor coupled across its inputs through said first and said second transistors, respectively, the first-mentioned phase shift network comprises a first parallel combination of a third capacitor and a first inductor coupled across the inputs of said detector, and wherein said second phase shift network includes a second parallel combination of a fourth capacitor and a second inductor, both connected in series with a fifth capacitor.

6. A television receiver as set forth in claim 5 wherein similar components in both said first and said second parallel combinations have the same values.

7. A television receiver as set forth in claim 4 further including a pair of loading resistors, one of each of said pair, respectively, coupled across each of said first and said second parallel combinations.

8. An audio system comprising:
   a source of angle-modulated signals;
   limiter/integrator for receiving angle-modulated signals from said source and for developing an output substantially free of amplitude modulation;
   a first phase shift network coupled to the output of said limiter/integrator;
   a differential amplifier detector coupled to said limiter/integrator and arranged with respect to said first phase shift network such that opposite polarity voltages are applied across the inputs of said differential amplifier detector;
   audio means coupled to the output of said differential amplifier detector; and
   a second phase shift network coupled across the output of said limiter/integrator for linearizing the response of said audio system.

9. An audio system as set forth in claim 8 wherein the linearity of said system is extended to encompass a ±40 MHz deviation in signal frequency.

10. An audio system as set forth in claim 9 wherein both said phase shift networks comprise series-parallel resonant circuits with the elements of the parallel resonant circuits of said first phase shift network being connected across the two inputs of said differential amplifier detector and the elements of the series resonant circuit of said second phase shift network being connected across the output of said limiter/integrator.

* * * * *